US012473752B2

(12) United States Patent
Lee et al.

(10) Patent No.: US 12,473,752 B2
(45) Date of Patent: Nov. 18, 2025

(54) HOUSEHOLD APPLIANCE

(71) Applicant: LG Electronics Inc., Seoul (KR)

(72) Inventors: Sunghun Lee, Seoul (KR); Byeonghyeon Ju, Seoul (KR); Jintae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 376 days.

(21) Appl. No.: 18/007,604

(22) PCT Filed: Aug. 31, 2020

(86) PCT No.: PCT/KR2020/011604
§ 371 (c)(1),
(2) Date: Dec. 1, 2022

(87) PCT Pub. No.: WO2021/246576
PCT Pub. Date: Dec. 9, 2021

(65) Prior Publication Data

US 2023/0228127 A1 Jul. 20, 2023

(30) Foreign Application Priority Data

Jun. 1, 2020 (KR) ........................ 10-2020-0065998

(51) Int. Cl.
*E05B 47/00* (2006.01)
*A47L 15/42* (2006.01)
*E05B 65/00* (2006.01)

(52) U.S. Cl.
CPC ...... *E05B 47/0012* (2013.01); *A47L 15/4259* (2013.01); *A47L 15/4274* (2013.01);
(Continued)

(58) Field of Classification Search
CPC ................. Y10S 292/04; Y10S 292/69; Y10T 292/1082; A47L 15/4259; E05B 2047/0067
See application file for complete search history.

(56) References Cited

U.S. PATENT DOCUMENTS

| | | | | |
|---|---|---|---|---|
| 8,469,469 | B2 | 6/2013 | Kim et al. | |
| 2020/0071963 | A1* | 3/2020 | Chirumbolo ............ | E05F 15/60 |
| 2021/0215346 | A1* | 7/2021 | Jang ...................... | F24C 15/022 |

FOREIGN PATENT DOCUMENTS

| | | |
|---|---|---|
| CN | 210383839 | 4/2020 |
| DE | 19960809 | 6/2001 |

(Continued)

OTHER PUBLICATIONS

Notice of Allowance in Korean Appln. No. 10-2020-0065998, dated Nov. 22, 2021, 4 pages (with English translation).

(Continued)

*Primary Examiner* — Christine M Mills
*Assistant Examiner* — Yahya Sidky
(74) *Attorney, Agent, or Firm* — Fish & Richardson P.C.

(57) ABSTRACT

Disclosed is a household appliance comprising: a door; a door lock unit equipped with a hook part which is configured to unlock and open the door by moving outward; a motor configured to generate torque by using electricity; a driving gear unit which has a rotary shaft at one end portion and is configured to rotate by receiving the torque from the motor, wherein the one end portion pushes the hook unit to the outside of the door lock unit to open the door when the driving gear unit rotates in one direction; a sensing unit configured to sense the displacement of the other end portion of the driving gear unit when the hook unit moves to the inside of the door lock unit, wherein the other end portion rotates in the opposite direction about the rotary shaft of the driving gear unit; and a control unit configured to control the operation of the motor on the basis of the displacement, sensed by the sensing unit, of the other end of the driving gear unit.

16 Claims, 14 Drawing Sheets

(52) U.S. Cl.
CPC ........... *E05B 65/00* (2013.01); *A47L 2401/26* (2013.01); *A47L 2501/22* (2013.01); *E05B 2047/0017* (2013.01); *E05B 2047/002* (2013.01); *E05B 2047/0067* (2013.01)

(56) References Cited

FOREIGN PATENT DOCUMENTS

| | | | | |
|---|---|---|---|---|
| EP | 1433893 | A2 | | 6/2004 |
| EP | 2846676 | | | 3/2015 |
| KR | 20170042191 | | | 4/2017 |
| KR | 20180132390 | | | 12/2018 |
| KR | 20210017351 | A | * | 2/2021 |
| WO | WO-2022045409 | A1 | * | 3/2022 |

OTHER PUBLICATIONS

Office Action in Korean Appln. No. 10-2020-0065998, dated May 10, 2021, 8 pages (with English translation).
Extended European Search Report in European Appln. No. 20939448.5, mailed on Jun. 24, 2024, 8 pages.

* cited by examiner

HOUSEHOLD APPLIANCE

CROSS-REFERENCE TO RELATED APPLICATIONS

This application is the National Stage filing under 35 U.S.C. 371 of International Application No. PCT/KR2020/011604, filed on Aug. 31, 2020, which claims the benefit of earlier filing date and right of priority to Korean Application No. 10-2020-0065998, filed on Jun. 1, 2020, the contents of which are all hereby incorporated by reference herein in their entirety.

TECHNICAL FIELD

The present disclosure relates to a household appliance having a door, such as a dishwasher.

BACKGROUND ART

Among household appliances, there are appliances having a door. For example, a household appliance having a door may include a dishwasher, an oven, a microwave range, and the like.

Meanwhile, a dishwasher is an appliance that washes dishes. A washing tank for washing dishes is provided inside a main body of the dishwasher.

The dishwasher generally includes a door coupled to a main body of the dishwasher to open and close the washing tank, and a locking device that locks the door to maintain a closed state of the door or unlocks the door.

Prior Patent Document EP 2 846 676 A2 (published on Mar. 18, 2015) discloses a household appliance having a door, such as a dishwasher. In the dishwasher of the prior patent document, there is disclosed a configuration of a door, and a locking device that locks the door and releases a locked state of the door.

The locking device of the prior patent document is configured to wind and pull a flexible element using a rotational force of an electric motor, and release a locked state of the door by moving a locking element in a latched state to the door in one direction as a transmission lever constituting one body with the flexible element rotates in one direction during the operation of the electric motor.

Here, the locking device of the prior patent document discloses a function of automatically opening the door while the electric motor is operated by a movement of pressing the door toward a main body of the dishwasher.

Specifically, in the case of the locking device of the prior patent document, a sensor that detects the pressing of the door is provided on an electronic circuit board. Furthermore, the sensor is configured to include two coils that generate a magnetic field so as to detect an induced current generated according to the movement of a measurement target provided on an aluminum plate moving together with the transmission lever.

However, in the case of the locking device of the prior patent document, it has a structure in which the sensor that detects the pressing of the door is directly connected to a portion moving the locking element in one direction in the transmission lever. According to such a structure of the sensor, when a displacement amount of the transmission lever is small, the sensor may not normally detect whether the displacement of the transmission lever has been generated. As a result, although a movement of pressing the door toward the main body has been generated, the sensor does not detect a pressing operation of the door, and as a result, a function of automatically opening the door by the operation of the electric motor may not be normally implemented.

In addition, in the case of the sensor of the prior patent document, although it was designed for the purpose of detecting a movement in a direction in which the door is pressed, an induced current may be generated by a movement in a direction in which the door is pressed due to an impact or the like applied to the locking device as well as a movement in another direction of the aluminum plate on which a measurement target of the sensor is provided, thereby reducing the reliability of the sensing performance of the sensor.

DISCLOSURE OF INVENTION

Technical Problem

An aspect of the present disclosure is to provide a household appliance having a sensing mechanism capable of stably detecting whether a movement of a door has been generated even when the movement of pressing the door toward a main body is relatively small.

Another aspect of the present disclosure is to provide a household appliance capable of stably detecting whether the door is pressed only with respect to the movement of pressing the door toward the main body.

Solution to Problem

In order to achieve the objectives of the present disclosure, a household appliance according to an embodiment of the present disclosure may include a door; a door lock portion provided with a hook portion configured to unlock the door to open the door when moving out thereof; an electric motor configured to generate a rotational force using electricity; a drive gear portion provided with a rotation axis at one end portion thereof to rotate by receiving the rotational force from the electric motor, and open the door by allowing one end portion thereof to push the hook portion out of the door lock portion when rotating in one direction; a sensing portion configured to detect a displacement of the other end portion of the drive gear portion rotating in the other direction about a rotation axis of the drive gear portion when the hook portion moves into the door lock portion; and a controller configured to control an operation of the electric motor based on the displacement of the other end portion of the drive gear portion detected by the sensing portion.

According to an example associated with the present disclosure, the household appliance may further include a lever portion configured such that one end thereof is disposed in contact with the drive gear portion, and the other end portion thereof rotates together as the one end portion thereof is pushed and rotated by the drive gear portion during the rotation of the drive gear portion, wherein the sensing portion is configured to detect a displacement of the other end portion of the lever portion, and configured to detect a displacement of the drive gear portion from the detected displacement of the other end portion of the lever portion.

According to an example associated with the present disclosure, the sensing portion may include a sensor housing; and a sensor configured to be movable in a first direction and a second direction opposite to the first direction on the sensor housing, and configured to detect a displacement of the other end portion of the lever portion by a movement moving on the sensor housing, wherein the other end portion of the lever portion is configured to move the sensor on the sensor housing during the rotation of the drive gear portion.

According to an example associated with the present disclosure, the sensing portion may further include an elastic portion configured to apply an elastic force that moves the sensor in the first direction to the sensor, wherein the sensor is disposed to protrude from the sensor housing, and the other end portion of the lever portion is disposed to be caught by the sensor so as to maintain a state of being in contact with the sensor to block the movement of the sensor in the first direction while one end portion thereof is in contact with the drive gear portion.

According to an example associated with the present disclosure, one end portion of the elastic portion may be fixed, and the other end portion thereof may be connected to the sensor to have an elastic force acting in a decreasing direction so as to move the sensor in the first direction.

According to an example associated with the present disclosure, the sensor may be provided with an engaging hole disposed to allow the other end portion of the elastic portion to be engaged and fixed.

According to an example associated with the present disclosure, the sensing portion may further include an elastic portion configured to apply an elastic force that moves the sensor in the first direction to the sensor, wherein the sensor is disposed to protrude from the sensor housing, and the other end portion of the lever portion and the sensor are configured with a single body.

According to an example associated with the present disclosure, the first direction and the second direction in which the sensor moves may be defined to lie on a single straight line.

According to an example associated with the present disclosure, the lever portion may include a lever shaft portion constituting a rotation axis of the lever portion, wherein the lever shaft portion is disposed adjacent to one end portion of the lever portion than the other end portion of the lever portion.

According to an example associated with the present disclosure, the household appliance may further include a roller portion provided on a portion where one end portion of the lever portion and the drive gear portion are in contact with each other to reduce a frictional resistance generated at a portion where one end portion of the lever portion and the drive gear portion are in contact with each other.

According to an example associated with the present disclosure, the sensing portion may include a sensor housing; and a sensor configured to be movable in a first direction and a second direction opposite to the first direction on the sensor housing, and configured to detect a displacement of the other end portion of the drive gear portion by a movement moving on the sensor housing, wherein the other end portion of the drive gear portion is configured to move the sensor on the sensor housing during the rotation of the drive gear portion.

According to an example associated with the present disclosure, the sensor may be disposed to protrude from the sensor housing, wherein the drive gear portion is provided with a through hole provided at the other end portion thereof and configured to allow the sensor to pass therethrough and be fixed thereto, and the sensor is configured to move together with the other end portion of the drive gear portion during the rotation of the drive gear portion in a state of being fixed to the through hole.

According to an example associated with the present disclosure, the sensing portion may further include an elastic portion configured to apply an elastic force that moves the sensor in the first direction to the sensor, wherein the sensor is disposed to protrude from the sensor housing, and configured to maintain a state of being in contact with the other end portion of the drive gear portion by being pushed in the first direction by the elastic portion.

According to an example associated with the present disclosure, the first direction and the second direction in which the sensor moves may be configured to form a movement path having the same curvature as a rotation path of the other end portion of the drive gear portion that is formed during the rotation of the drive gear portion.

According to an example associated with the present disclosure, the sensing portion may be configured to detect a displacement of the other end portion of the drive gear portion according to whether a position of the other end portion of the drive gear portion is changed after the displacement compared to a position before the displacement of the other end portion of the drive gear portion is generated.

According to an example associated with the present disclosure, the controller may be configured to operate the electric motor when the sensing portion detects a displacement of the other end portion of the drive gear portion.

Advantageous Effects of Invention

The effects of the present disclosure obtained through the foregoing solutions are as follows.

A household appliance may include a drive gear portion in which one end portion thereof pushes a hook portion out of a door lock portion to open a door when rotating in one direction, and a sensing portion configured to detect a displacement of the other end portion of the drive gear portion rotating in the other direction as the one end portion of the drive gear portion is pushed into the door lock portion when the hook portion moves into the door lock portion.

According to the configuration of the household appliance as described above, the sensing portion may be configured to detect a displacement generated at the other end portion of the drive gear portion rotating in the other direction when a movement of pressing the door has been generated, other than a displacement of one end portion of the drive gear portion where a rotation axis thereof is disposed to generate a movement of being pushed into the door lock portion by the pressing of the door. Accordingly, a displacement generated at one end portion of the drive gear portion may be greatly amplified at the other end portion thereof. As a result, even when the movement of the door generated due to a pressing operation of the door is small, the sensing portion may stably detect whether the movement of the door has been generated.

In addition, the sensing portion of the household appliance may include a sensor configured to detect a displacement of the other end portion of the drive gear portion by a movement moving on a sensor housing in a first direction and a second direction opposite to the first direction. Accordingly, the detection of whether the movement of the door has been generated due to the pressing of the door may be carried out only by the movement of sensors moving in opposite directions, thereby preventing a phenomenon in which the sensing portion erroneously detects a movement caused by a factor other than the pressing of the door due to an impact or the like applied to the household appliance, in particular, the sensing portion.

MODE FOR THE INVENTION

Hereinafter, a household appliance 100 associated with the present disclosure will be described in detail with reference to the accompanying drawings.

According to the present specification, the same or similar elements are designated with the same numeral references even in different embodiments and their redundant description will be omitted.

A singular representation may include a plural representation as far as it represents a definitely different meaning from the context.

Figure 1:
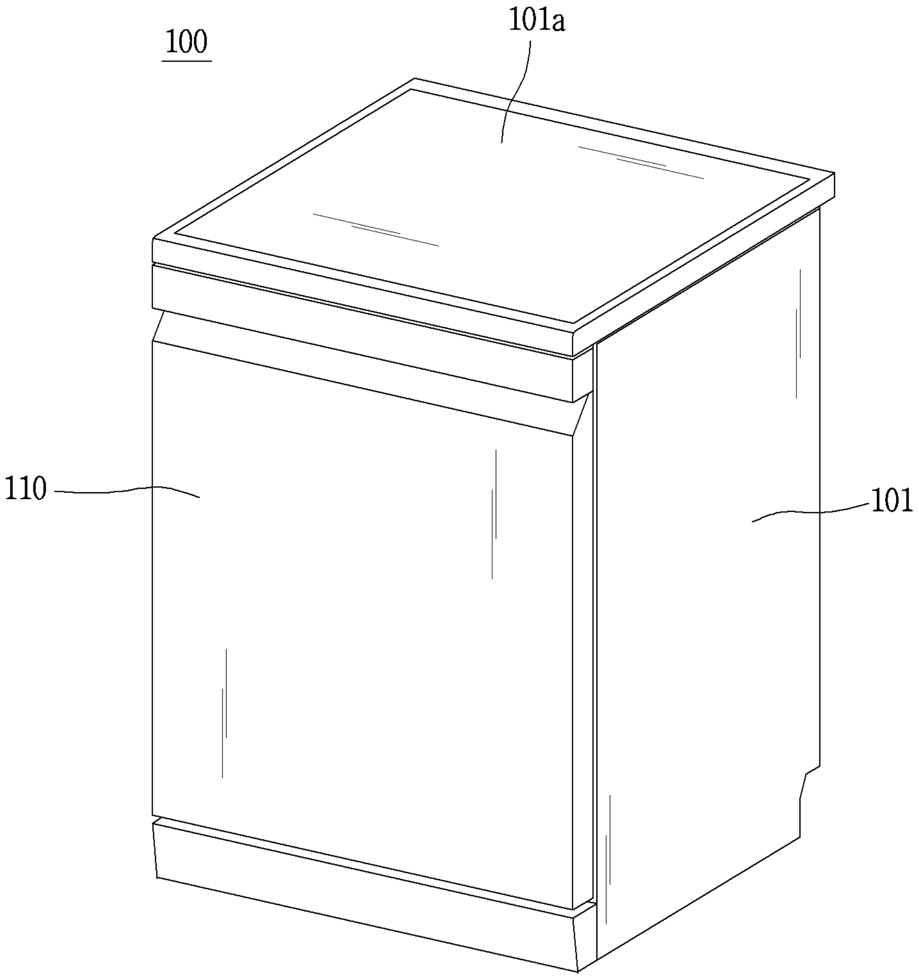
FIG. 1 is a perspective view showing a household appliance according to an embodiment of the present disclosure.
Figure 2:
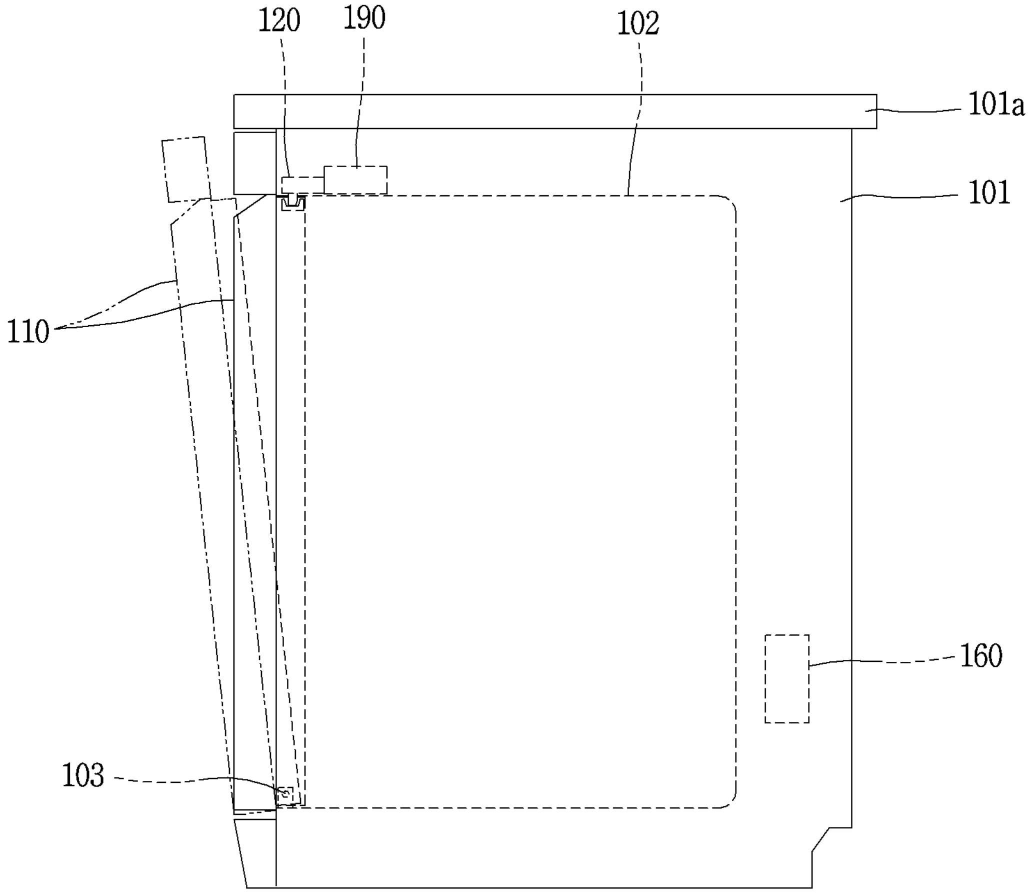
FIG. 2 is a view conceptually showing a lateral side of the household appliance illustrated in FIG. 1.
Figure 3:
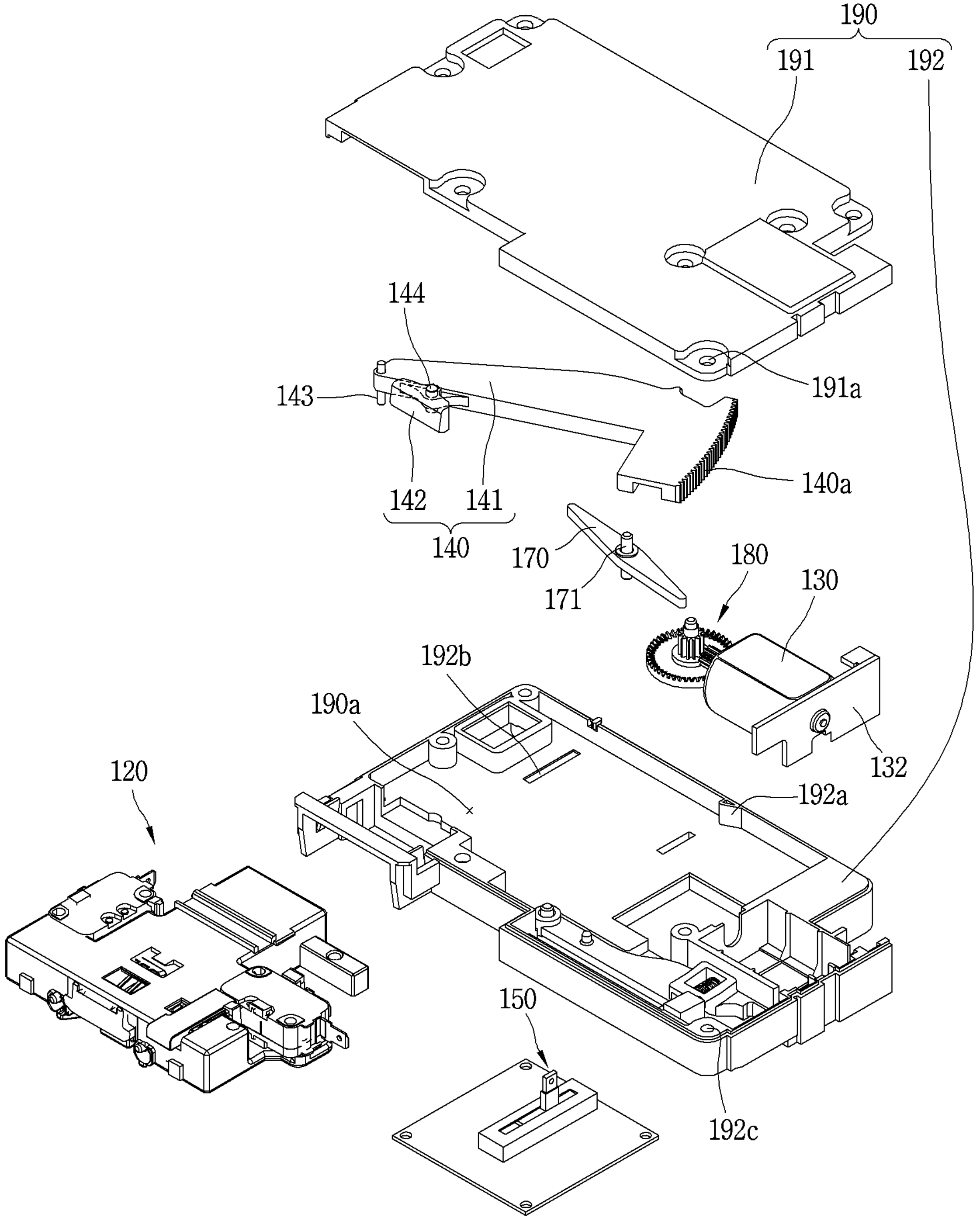
FIG. 3 is an exploded perspective view showing a shape of a door lock portion and components that operate the door lock portion illustrated in FIG. 2.
Figure 4:
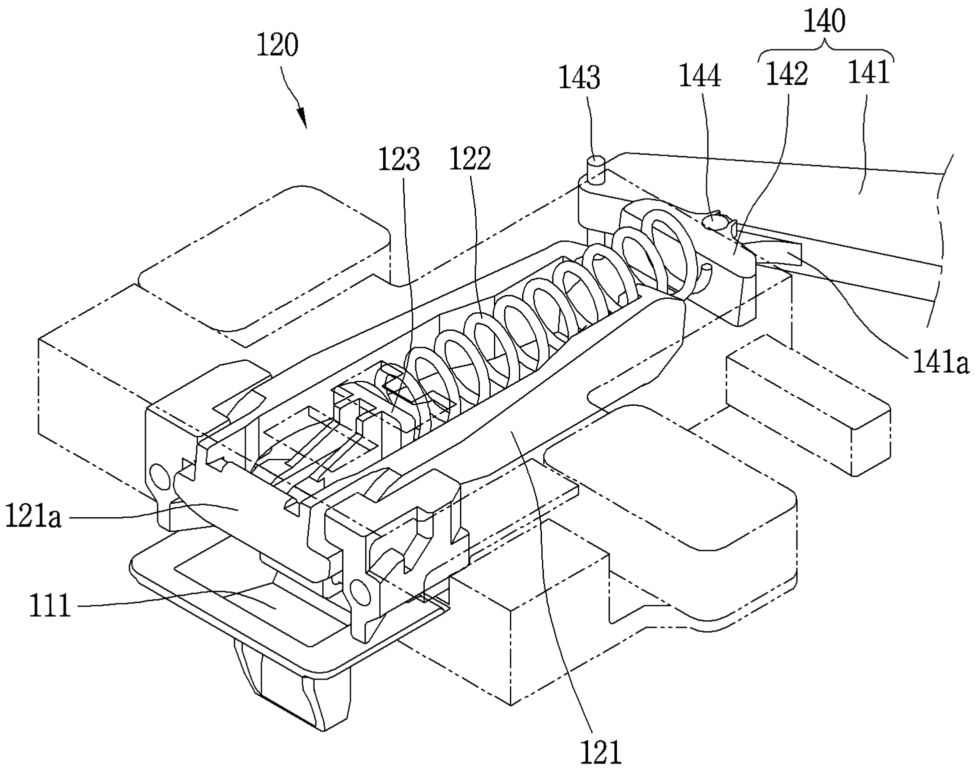
FIG. 4 is a perspective view conceptually showing an inner shape of the door lock portion illustrated in FIG. 3.
Figure 5:
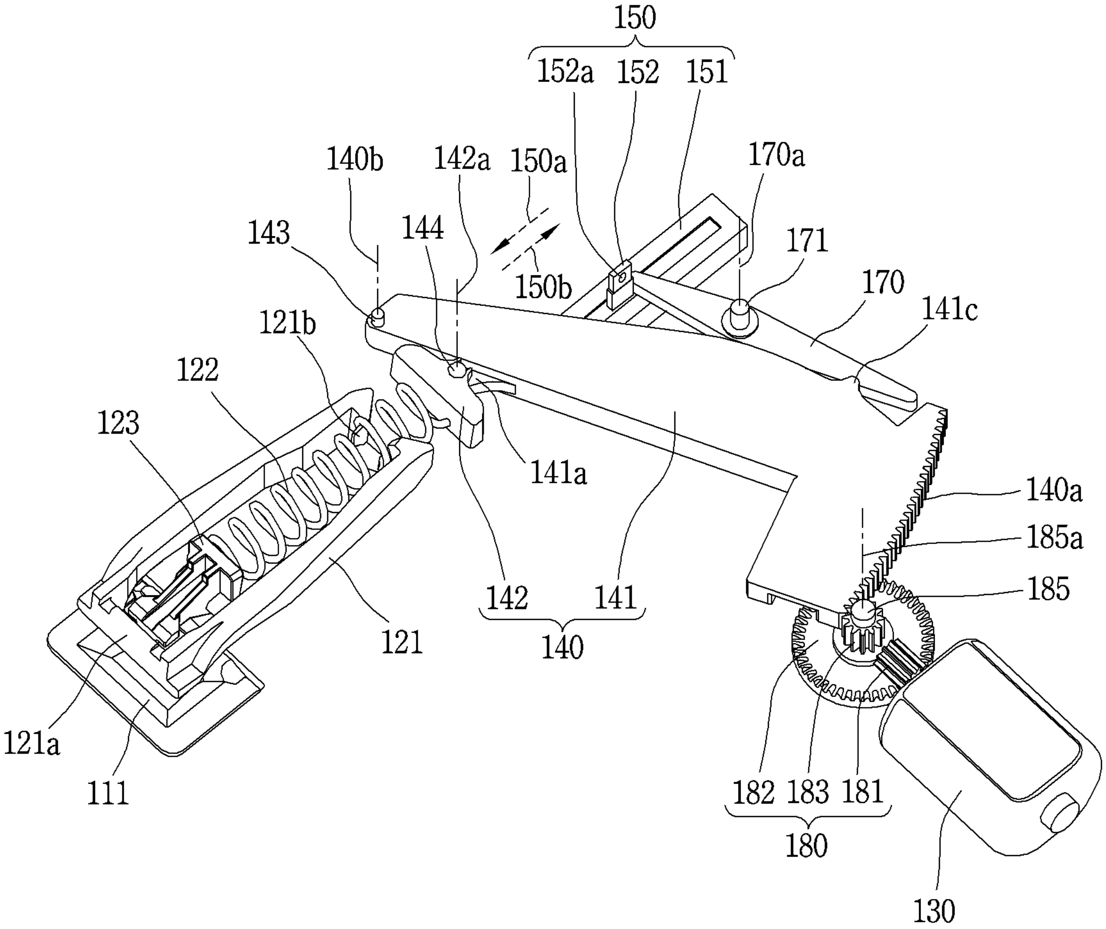
FIG. 5 is a perspective view showing a shape in which components configured to open a door by pushing a hook portion of the door lock portion illustrated in FIG. 3 out of the door lock portion are assembled around a drive gear portion.
Figure 6:
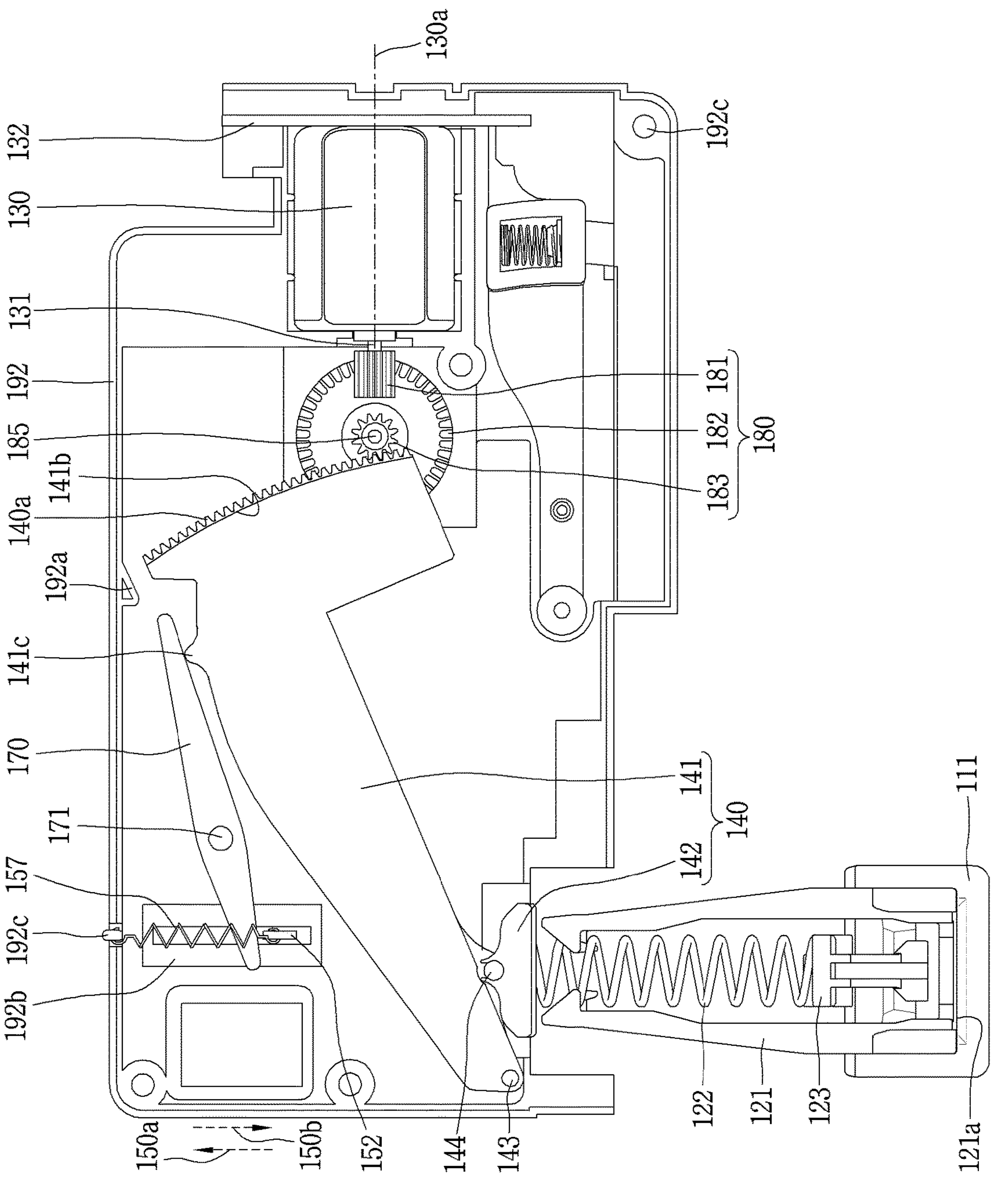
FIG. 6 is a view conceptually showing a shape in which the door is in a locked state.
Figure 7:
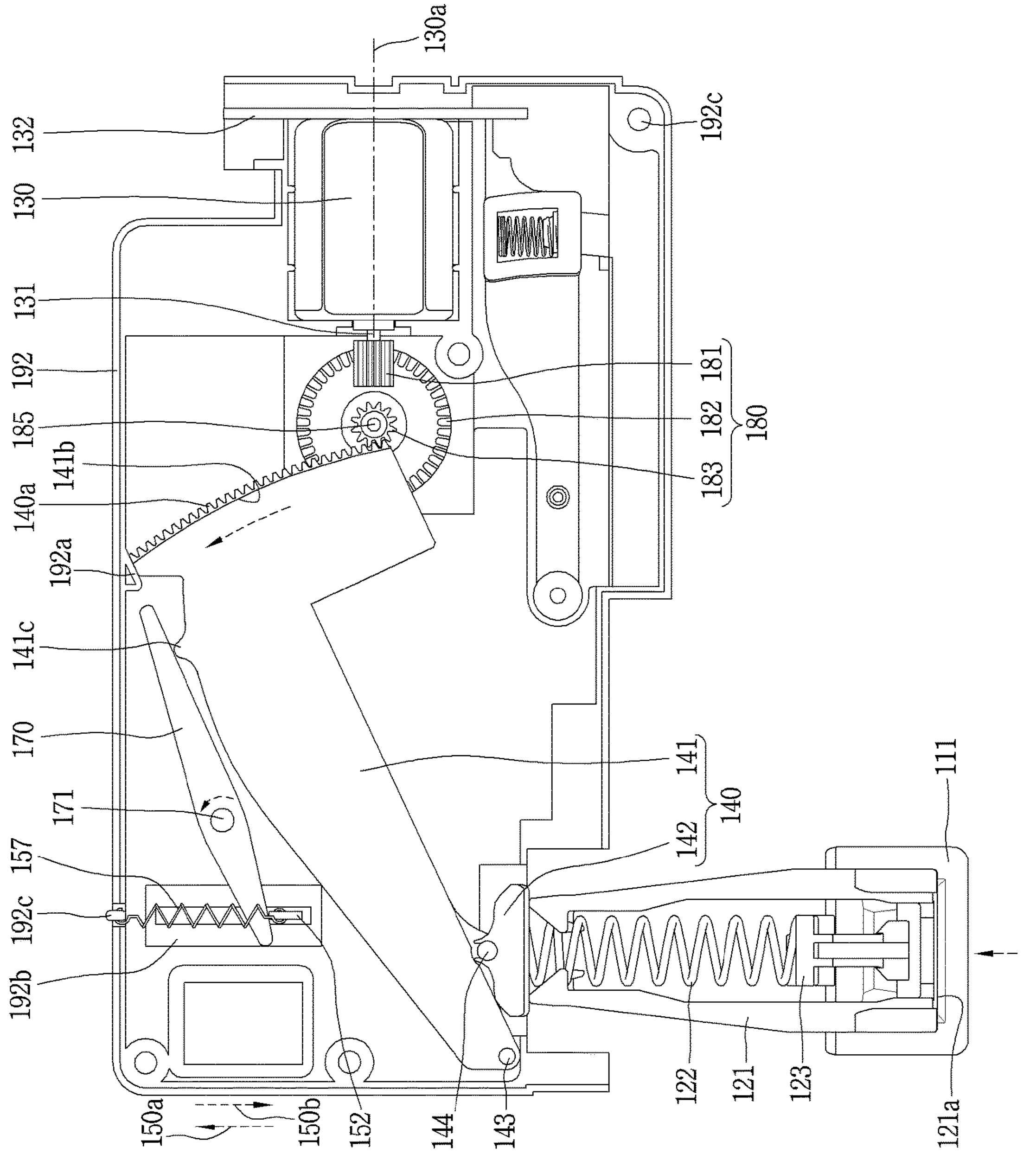
FIG. 7 is a view conceptually showing a state in which a displacement is generated at the other end portion of the drive gear portion while the hook portion illustrated in FIG. 6 moves into the door lock portion due to the pressing of the door.
Figure 8:
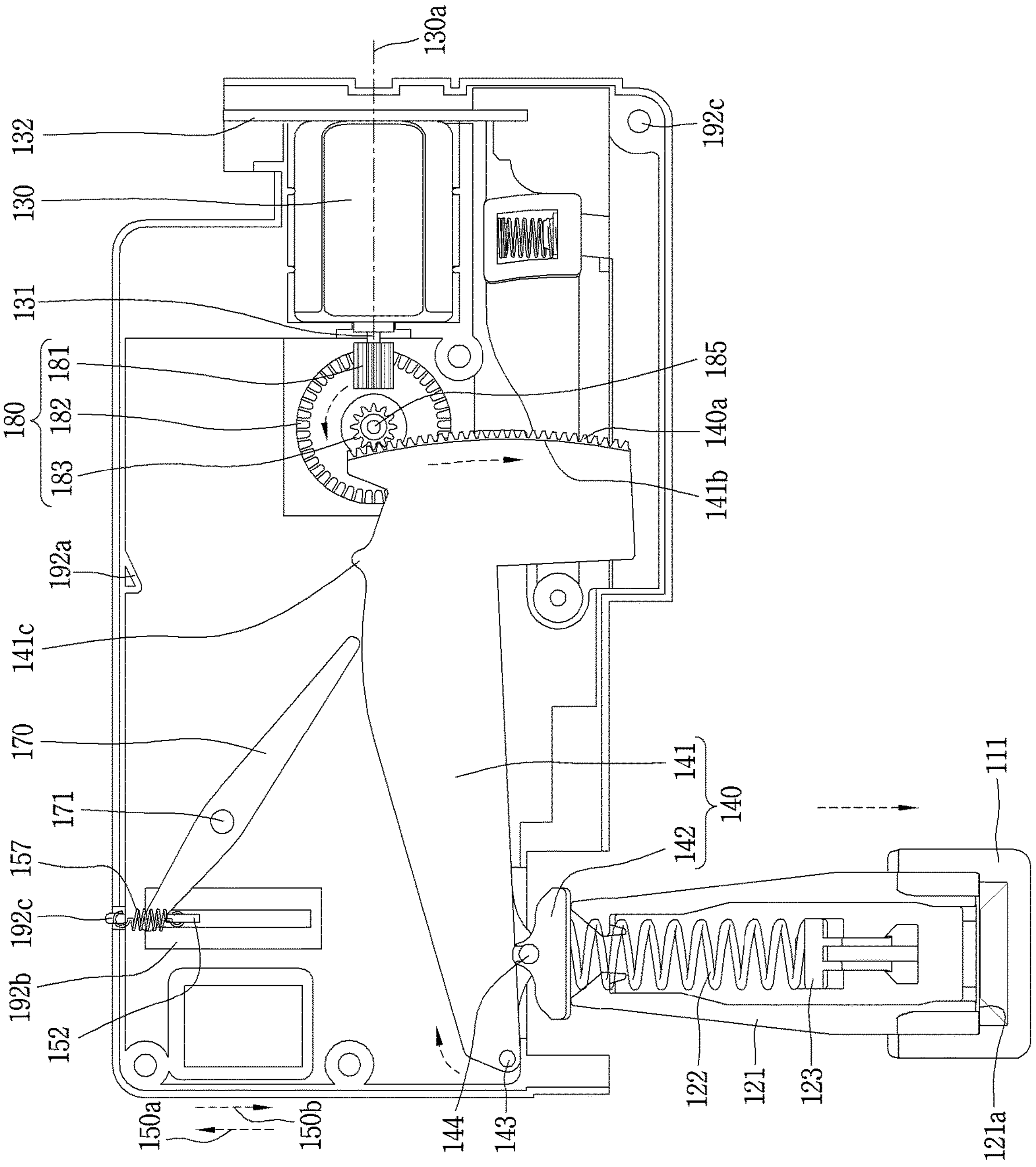
FIG. 8 is a view conceptually showing a shape in which the drive gear portion rotates to release a locked state of the door as an electric motor illustrated in FIG. 7 operates by a controller.

FIG. 1 is a perspective view showing the household appliance 100 according to an embodiment of the present disclosure, FIG. 2 is a view conceptually showing a lateral side of the household appliance 100 illustrated in FIG. 1, FIG. 3 is an exploded perspective view showing a shape of a door lock portion 120 and components that operate the door lock portion 120 illustrated in FIG. 2, FIG. 4 is a perspective view conceptually showing an inner shape of the door lock portion 120 illustrated in FIG. 3, FIG. 5 is a perspective view showing a shape in which components configured to open a door 110 by pushing a hook portion 121 of the door lock portion 120 illustrated in FIG. 3 out of the door lock portion 120 are assembled around a drive gear portion 140, FIG. 6 is a view conceptually showing a shape in which the door 110 is in a locked state, FIG. 7 is a view conceptually showing a state in which a displacement is generated at the other end portion of the drive gear portion 140 while the hook portion 121 illustrated in FIG. 6 moves into the door lock portion 120 due to the pressing of the door 110, and FIG. 8 is a view conceptually showing a shape in which the drive gear portion 140 rotates to release a locked state of the door 110 as an electric motor 130 illustrated in FIG. 7 operates by a controller 160.

Referring to FIGS. 1 to 8, the household appliance 100 includes a door 110, a door lock portion 120, an electric motor 130, a drive gear portion 140, a sensing portion 150, and a controller 160.

The household appliance 100 refers to an appliance that is mainly used at home. In particular, the household appliance 100 of the present disclosure may include a dishwasher, an oven, and a microwave range, which are provided with the door 110.

In this specification, the dishwasher will be described as an example among the household appliances 100 having the door 110. A washing tank 102 that washes dishes may be provided inside a main body 101 of the household appliance 100. The main body 101 may have an opening portion provided on one side thereof. In the drawings of the present disclosure, it is shown a shape in which the opening portion is disposed in front of the main body 101. The opening portion may constitute an inlet port of the washing tank 102. A shelf (not shown) on which dishes can be mounted may be disposed inside the washing tank 102. Furthermore, an upper plate 101*a* disposed to cover an upper side of the main body 101 may be disposed on an upper surface of the main body 101.

The door 110 may be rotatably coupled to the main body 101 to open and close the opening portion. For example, as illustrated in FIGS. 1 and 2, the door 110 may be disposed in front of the main body 101 to open and close the opening portion. The household appliance 100 may include a hinge portion 103 allowing the door 110 to be rotatably coupled to the main body 101. Referring to FIGS. 1 and 2, the hinge portion 103 may be configured to couple a lower end portion of the door 110 to the main body 101. Accordingly, as an upper end portion of the door 110 is rotated in a forward direction of the main body 101 about the hinge portion 103, the opening portion may be opened. Meanwhile, the opening portion and the door 110 may be disposed on the other side of the main body 101 instead of the front of the main body 101.

The door 110 may include a door engaging portion 111 disposed to be caught by a hook engaging portion 121*a* to be described later.

The door lock portion 120 is configured to maintain a closed state of the door 110 or release a locked state of the door 110. The door lock portion 120 may include a hook portion 121 configured to lock the door 110 or unlock the door 110. The door lock portion 120 may be provided in the main body 101 as illustrated in FIG. 2. Furthermore, although not illustrated in the drawings of the present disclosure, the door lock portion 120 may be provided in the door 110. When an upper end portion of the door 110 rotates toward a front side of the main body 101 around the hinge portion 103 due to the weight of the door 110 while unlocking the door 110, the door 110 will be opened.

The hook portion 121 is configured to unlock the door 110 when moving out of the door lock portion 120 to open the door 110. Conversely, the hook portion 121 locks the door 110 when moving into the door lock portion 120 to maintain a closed state of the door 110. The hook portion 121 may include the hook engaging portion 121*a* provided at one end. The hook engaging portion 121*a* may be disposed to be caught by the door engaging portion 111 provided in the door 110.

The electric motor 130 is configured to generate a rotational force using electricity. A substrate 132 disposed with an electric circuit may be disposed on one side of the electric motor 130. The electric motor 130 may be configured to be electrically connected to the substrate 132. The electric motor 130 may include a shaft 131 that constitutes a rotation axis 130*a* of the electric motor 130.

The drive gear portion 140 may be provided with a rotation axis 140*b* at one end portion thereof, and configured to rotate by receiving the rotational force generated during the operation of the electric motor 130 from the electric motor 130, and configured to open the door 110 by allowing one end portion thereof to push the hook portion 121 of the door lock portion 120 out of the door lock portion 120 when rotating in one direction. For example, the drive gear portion 140 may be configured to push the hook portion 121 out of the door lock portion 120 when rotating clockwise. The drive gear portion 140 is configured to be rotatable in one direction or the other direction.

At least part of the drive gear portion 140 may be made of a polyacetal material. Furthermore, the drive gear portion 140 may include a toothed portion 140*a* disposed to engage with a gear portion 180 to be described later. The toothed portion 140*a* may be disposed to directly engage with the gear portion 180 to be described later, and configured to directly receive the rotational force transmitted from the electric motor 130 to the gear portion 180.

When the hook portion 121 of the door lock portion 120 moves into the door lock portion 120, the sensing portion 150 may be configured to sense a displacement of the other end portion of the drive gear portion 140 rotating in the other direction about the rotation axis 140*b* of the drive gear portion 140.

The sensing portion 150 may be configured to detect a displacement of the other end portion of the drive gear portion 140 according to whether a position of the other end portion of the drive gear portion 140 is changed after the displacement compared to a position before the displacement of the other end portion of the drive gear portion 140 is generated. Accordingly, even when an initial position of the other end portion of the drive gear portion 140 is changed, whether a displacement of the other end portion of the drive gear portion 140 has been generated may be stably detected.

Meanwhile, the household appliance 100 may further include a lever portion 170.

The lever portion 170 may be configured such that one end portion thereof is disposed in contact with the drive gear portion 140, and the other end portion thereof rotates together as the one end portion thereof is pushed and rotated by the drive gear portion 140 during the rotation of the drive gear portion 140 about the rotation axis 140*b* of the drive gear portion 140. The lever portion 170 may include a lever shaft portion 171 constituting a rotation axis 170*a* of the lever portion 170. The lever shaft portion 171 may be provided between one end portion and the other end portion of the lever portion 170. For example, the lever shaft portion 171 may be disposed adjacent to the other end portion of the lever portion 170 than one end portion of the lever portion 170. The lever shaft portion 171 may be disposed on a central portion of the one end portion and the other end portion of the lever portion 170.

Here, the sensing portion 150 is configured to detect the displacement of the other end portion of the lever portion 170, and configured to detect the displacement of the drive gear portion 140 from the detected displacement of the other end portion of the lever portion 170. That is, the sensing portion 150 may be configured to receive the displacement of the other end portion of the drive gear portion 140 generated during the rotation of the drive gear portion 140 from the lever portion 170.

In addition, the sensing portion 150 may include a sensor housing 151 and a sensor 152.

The sensor housing 151 may be disposed to accommodate the sensor 152 to be described later.

The sensor 152 is configured to be movable along a first direction 150*a* and a second direction 150*b* opposite to the first direction 150*a* on the sensor housing 151, and configured to detect the displacement of the other end portion of the lever portion 170 by a movement moving on the sensor housing 151. The first direction 150*a* and the second direction 150*b* in which the sensor 152 moves on the sensor housing 151 may be defined to lie on a single straight line. That is, the first and second directions 150*a*, 150*b* in which the sensor 152 moves may be configured to define a single movement path.

Here, the other end portion of the lever portion 170 may be configured to move the sensor 152 on the sensor housing 151 during the rotation of the drive gear portion 140.

The sensing portion 150 may further include an elastic portion 157.

The elastic portion 157 may be configured to apply an elastic force that moves the sensor 152 in the first direction 150*a* to the sensor 152. At least part of the elastic portion 157 may be configured to have a spring structure.

One end portion of the elastic portion 157 may be fixed, and the other end portion thereof may be connected to the sensor 152 to have an elastic force acting in a decreasing direction so as to move the sensor 152 of the sensing portion 150 in the first direction 150*a*. For example, the elastic portion 157 may be connected to a ring portion 192*c*, one end portion of which is connected to an engaging hole 152*a* and the other end portion of which is provided on a second cover 192 of a housing portion 190. The elastic portion 157 may be configured such that an elastic force acts in a decreasing direction. That is, the elastic portion 157 is configured to move the sensor 152 moving along one direction on the sensor housing 151 toward the ring portion 192*c* of the second cover 192.

Furthermore, the sensor 152 may be provided with an engaging hole 152*a* disposed to allow the other end portion of the elastic portion 157 to be engaged and fixed. The sensing portion 150 may be assembled from a bottom surface of the second cover 192 of the housing portion 190. In addition, the second cover 192 may be provided with a through hole 192*b* providing a space through which the sensor 152 passes through the bottom surface of the second cover 192 to protrude toward an upper surface of the second cover 192.

Here, the sensor 152 may be disposed to protrude from the sensor housing 151. In addition, the other end portion of the lever portion 170 may be disposed to be caught by the sensor 152 to block the movement of the sensor 152 in the first direction 150*a* while one end portion thereof is in contact with the drive gear portion 140, and configured to maintain a state of being in contact with the sensor 152 even when the rotation of the drive gear portion 140 is generated in one direction or the other direction.

Meanwhile, although not shown in the drawings of the present disclosure, the other end portion of the lever portion 170 and the sensor 152 may be configured with a single body. That is, the other end portion of the lever portion 170 may be configured to move together with the sensor 152 moving in the first direction 150*a* by the elastic portion 157. According to the structure of the lever portion 170 as described above, a connection structure between the other end portion of the lever portion 170 and the sensor 152 may be formed more firmly.

The controller 160 may be configured to control the operation of the electric motor 130 based on a displacement of the other end portion of the drive gear portion 140 detected by the sensing portion 150. For example, the controller 160 may be configured to operate the electric motor 130 when a displacement of the other end portion of the drive gear portion 140 is detected by the sensing portion 150. The controller 160 may be configured to perform overall control related to a manipulation of the household appliance 100 as well as the control of the electric motor 130. The controller 160 may be configured to selectively control the operation of the electric motor 130 according to an operating state of the household appliance 100. For example, when a specific operation process of the household appliance 100 is terminated, the controller 160 may operate the electric motor 130 to open the door 110.

Meanwhile, the gear portion 180 that receives the rotational force from the electric motor 130 to transmit the received rotational force to the drive gear portion 140 may be provided between the electric motor 130 and the drive gear portion 140.

The gear portion 180 may be configured to rotate by receiving a rotational force from the electric motor 130. The gear portion 180 may be configured to have a smaller number of output rotations than that of input rotations to reduce a rotational speed of the shaft 131. According to the configuration of the gear portion 180 as described above, the rotational speed of the shaft 131 is decreased while the rotational force of the electric motor 130 is increased while being transmitted through the gear portion 180. At least a part of the gear portion 180 may be made of a polyacetal material.

For example, the gear portion 180 may include a first gear 181, a second gear 182, and a third gear 183.

The first gear 181 may be coupled to the shaft 131 of the electric motor 130 to rotate together with the shaft 131 about the rotation axis 130*a* of the electric motor 130. For deceleration of the electric motor 130, the number of teeth of the first gear 181 may be smaller than that of teeth of the second gear 182 to be described later.

The second gear 182 may be disposed to engage with the first gear 181, and configured to have a rotation axis 145*a* intersecting the rotation axis 130*a* of the electric motor 130. The gear portion 180 may include a gear shaft 185 constituting the rotation shaft 185*a* of the second gear 182 and the rotation axis 185*a* of a third gear 183 to be described later. The gear shaft 185 may be disposed to protrude on one surface of the second gear 182. The first and second gears 181, 182 may be configured to form the same rotational direction. For example, when the first gear 181 rotates clockwise, the second gear 182 may also be configured to rotate clockwise, and when the first gear 181 rotates counterclockwise, the second gear 182 may also be configured to rotate counterclockwise.

The third gear 183 may be configured to be coupled to the second gear 182 to rotate together with the second gear 182. For example, the third gear 183 may be coupled to the gear shaft 185 disposed on one surface of the second gear 182. The third gear 183 may constitute the same rotation axis 185*a* about the second gear 182 and the gear shaft 185. Furthermore, the number of teeth of the third gear 183 may be configured to be smaller than that of teeth of the second gear 182.

Furthermore, the third gear 183 rotating together with the second gear 182 may be configured to engage with the toothed portion 140*a* provided in the drive gear portion 140 to transmit the rotational force of the electric motor 130 to the drive gear portion 140. Here, the number of rotations of the drive gear portion 140 may be smaller than that of rotations of the third gear 183. Accordingly, the rotational force of the electric motor 130 is increased while being transmitted from the third gear 183 to the drive gear portion 140. The third gear 183 and the drive gear portion 140 may be configured to form opposite rotational directions. For example, when the third gear 183 rotates clockwise, the drive gear portion 140 may be configured to rotate counterclockwise, and when the third gear 183 rotates counterclockwise, the drive gear portion 140 may be configured to rotate clockwise.

Meanwhile, the household appliance 100 may further include a housing portion 190 accommodating the drive gear portion 140. The housing portion 190 may include an accommodation space 190*a* disposed to accommodate the drive gear portion 140. The accommodation space 190*a* may be disposed to accommodate the electric motor 130 and the gear portion 180 together with the drive gear portion 140. The housing portion 190 may include a first cover 191 and a second cover 192 that are coupled to each other to constitute the accommodation space 190*a*. The first cover 191 and the second cover 192 may be provided with a first fastening hole 191*a* and a second fastening hole 192*c*, respectively, which are configured to assemble a fastening member (not shown) for fastening the first and second covers 191, 192.

Furthermore, the housing portion 190 may include a stopper 192*a*.

The stopper 192*a* may be configured to be in contact with part of the drive gear portion 140 on a path where the drive gear portion 140 rotates, thereby limiting a rotational operation of the drive gear portion 140 to a preset position. According to the configuration of the stopper 192*a*, even when the electric motor 130 malfunctions, the rotation of the drive gear portion 140 may be stably operated within a range of the designed rotation path.

Meanwhile, the drive gear portion 140 may include a first section 141 and a second section 142.

The first section 141 is configured to be provided with the toothed portion 140*a* disposed to engage with the gear portion 180.

The second section 142 may be configured to be rotatably coupled to the first section 141, and disposed between the first section 141 and the hook portion 121 to push the hook portion 121 out of the door lock portion 120 when the first section 141 rotates in one direction.

The drive gear portion 140 may include a connection pin 144 that rotatably couples the second section 142 to the first section 141. The connection pin 144 may be coupled to a rib 141*a* provided on the first section 141 as illustrated in FIG. 5. The connection pin 144 may be configured to constitute a rotation axis 142*a* of the second section 142.

Meanwhile, the toothed portion 140*a* may be provided on one side of the first section 141 of the drive gear portion 140. In addition, the rotation axis 140*b* of the drive gear portion 140 engaged with the gear portion 180 by the toothed portion 140*a* may be disposed on the other side of the first section 141. The drive gear portion 140 may include a shaft portion 143 provided on the other side of the drive gear portion 140 to constitute a rotation axis 140*b* of the drive gear portion 140. The shaft portion 143 may be configured to be fixed to the housing portion 190 accommodating the drive gear portion 140.

Here, the second section 142 of the drive gear portion 140 may be disposed adjacent to the rotation axis 140*b* of the drive gear portion 140. According to the configuration of the second section 142 as described above, a greater force may be applied to the second section 142 when the drive gear portion 140 is rotated due to a lever structure to further improve the efficiency of the electric motor 130.

Meanwhile, the first section 141 of the drive gear portion 140 may include a curved surface portion 141*b* provided on one side of the first section 141 as illustrated in FIGS. 6 to 8 and configured with a curved surface. Here, the toothed portion 140*a* may be disposed on the curved surface portion 141*b*. For example, the curved surface portion 141*b* may be disposed in a convex manner in a direction away from the rotation axis 140*b* of the drive gear portion 140. According to the structure of the toothed portion 140*a* as described above, a gear ratio of the toothed portion 140*a* and the gear portion 180 may be further increased to increase the rotational force of the electric motor 130 transmitted to the drive gear portion 140. The gear ratio may be defined as a value obtained by dividing the number of teeth of a large gear by the number of teeth of a small gear.

Meanwhile, the door lock portion 120 may further include a spring 122 and a support portion 123.

The spring 122 may be configured such that one end portion thereof is disposed in contact with the second section 142 of the drive gear portion 140, and caught by the other end portion of the hook portion 121 to pressurize the hook portion 121 into the door lock portion 120. An engaging protrusion portion 121*b* engaged with part of the spring 122 may be provided at the other end of the hook portion 121. The spring 122 may be configured such that an elastic force acts in an extending direction.

The support portion 123 may be disposed in contact with the other end portion of the spring 122. Furthermore, the support portion 123 may be configured to support the other end portion of the spring 122. The support portion 123 may be disposed in a fixed state regardless of the movement of the hook portion 121 on the door lock portion 120.

A more detailed structure related to the operation of the door lock portion 120 will be described later with reference to FIGS. 13 and 14.

Hereinafter, other examples of the sensing portion 150 illustrated in FIG. 5 will be further described with reference to FIGS. 9 to 12 together with FIGS. 1 to 8.

FIGS. 9 to 12 are views conceptually showing other examples of the sensing portion 150 illustrated in FIG. 5, respectively.

Figure 9:
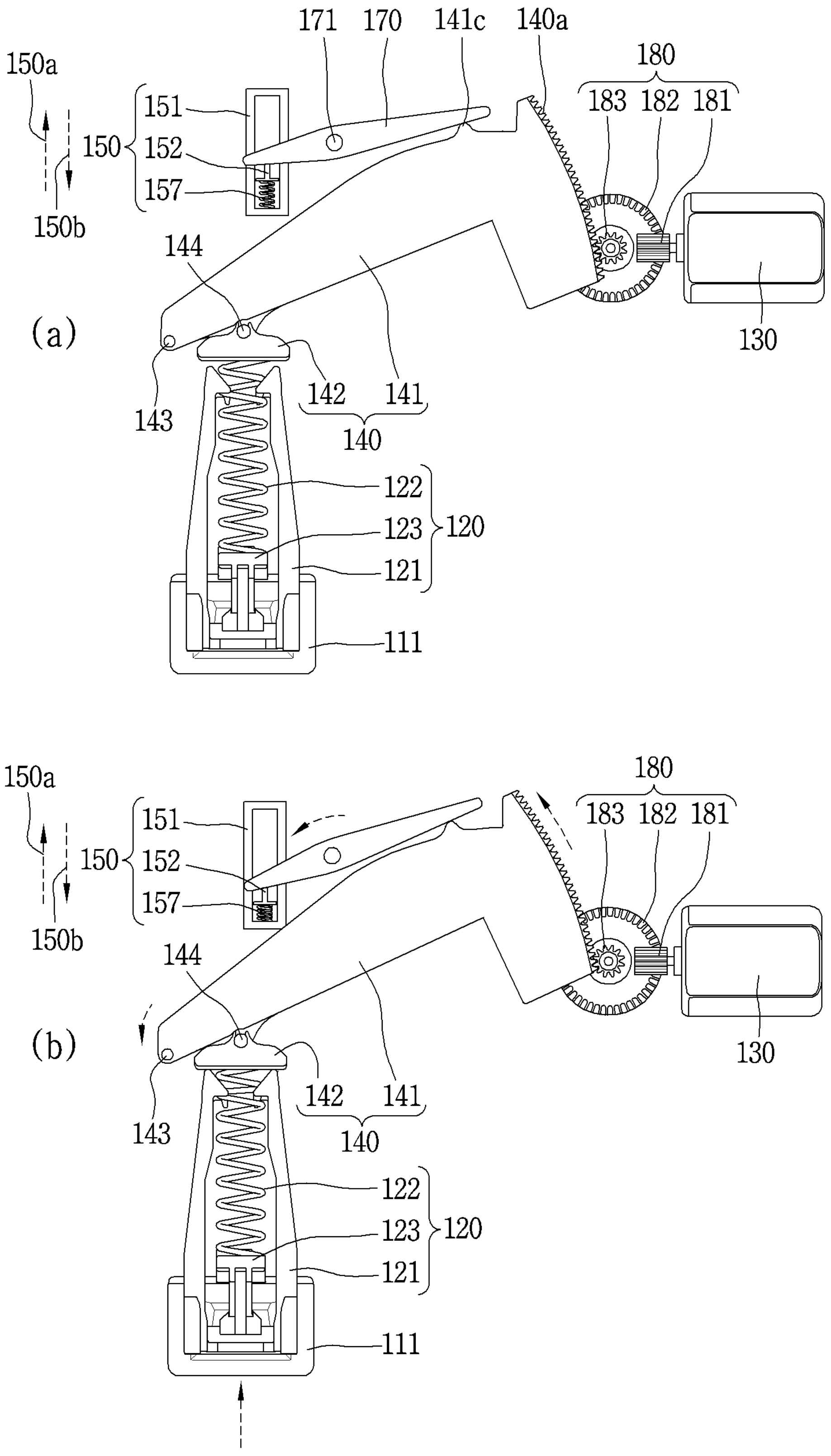
FIGS. 9 to 12 are views conceptually showing other examples of the sensing portion illustrated in FIG. 5, respectively.

Referring first to FIG. 9, (a) of FIG. 9 illustrates a shape in which the door 110 is in a locked state. Furthermore, (b) of FIG. 9 shows a state in which a displacement is generated at the other end portion of the drive gear portion 140 due to the pressing of the door 110 while the hook portion 121 moves into the door lock portion 120.

As illustrated in FIG. 9, the sensing portion 150 may include a sensor housing 151 and a sensor 152.

The sensor housing 151 may be disposed to accommodate the sensor 152 to be described later.

The sensor 152 is configured to be movable along the first direction 150*a* and a second direction 150*b* opposite to the first direction 150*a* on the sensor housing 151, and configured to detect the displacement of the other end portion of the lever portion 170 by a movement moving on the sensor housing 151. The sensor 152 may be disposed to protrude from the sensor housing 151.

In addition, the sensing portion 150 may include an elastic portion 157 configured to act on the sensor 152 to move the sensor 152 in the first direction 150*a*.

Here, the other end portion of the lever portion 170 may be configured to move the sensor 152 on the sensor housing 151 during the rotation of the drive gear portion 140. For example, the other end portion of the lever portion 170 may be disposed to be caught by the sensor 152 so as to maintain a state of being in contact with the sensor 152 to block the movement of the sensor 152 in the first direction 150*a* while one end portion of the lever portion 170 is in contact with the drive gear portion 140.

Meanwhile, although not shown in the drawings of the present disclosure, the other end portion of the lever portion 170 and the sensor 152 may be configured with a single body. That is, the other end portion of the lever portion 170 may be configured to move together with the sensor 152 moving in the first direction 150*a* by the elastic portion 157. According to the structure of the lever portion 170 as described above, a connection structure between the other end portion of the lever portion 170 and the sensor 152 may be formed more firmly.

Figure 10:
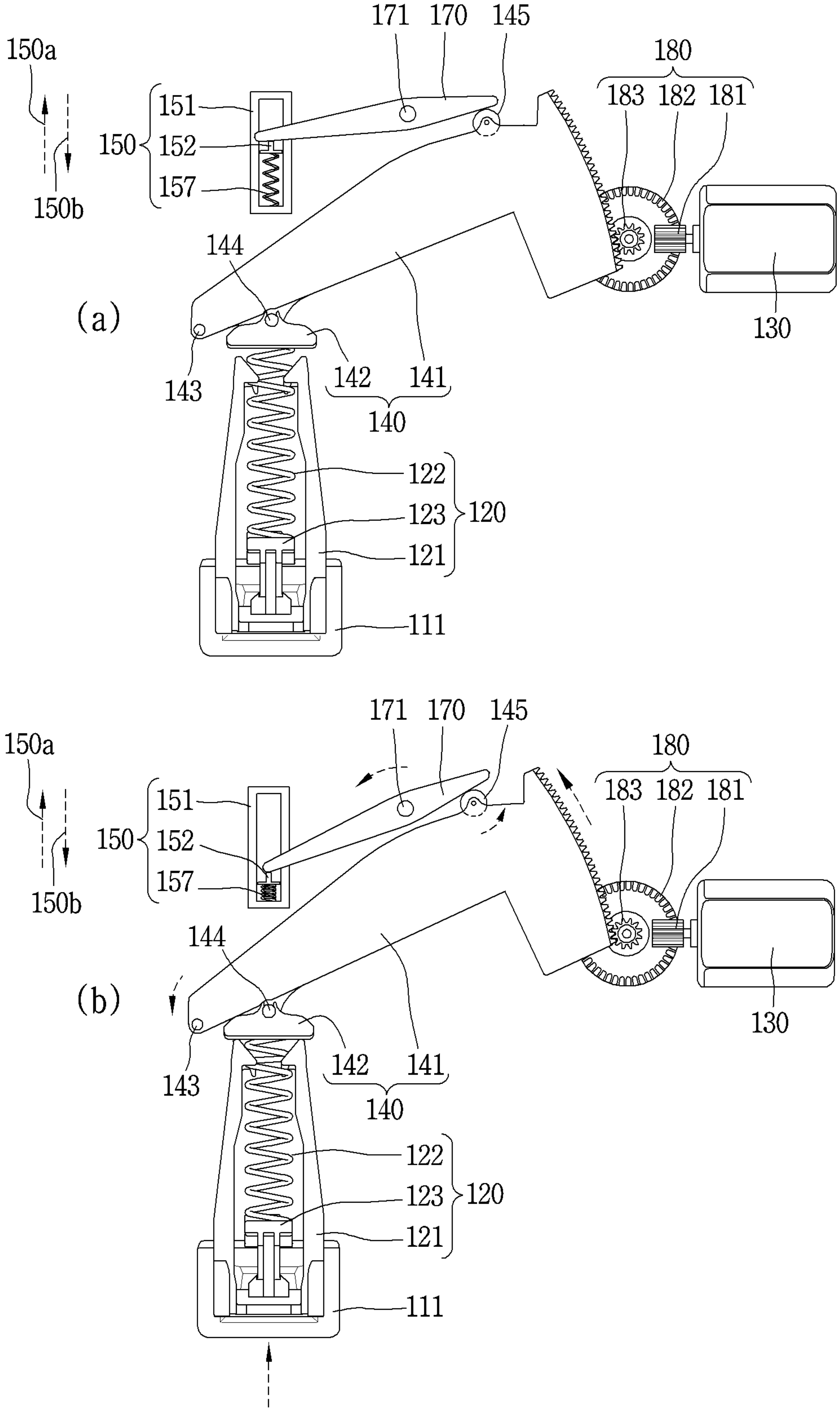

Next, referring to FIG. 10, (a) of FIG. 10 illustrates a shape in which the door 110 is in a locked state. Furthermore, (b) of FIG. 10 shows a state in which a displacement is generated at the other end portion of the drive gear portion 140 due to the pressing of the door 110 while the hook portion 121 moves into the door lock portion 120.

As illustrated in FIG. 10, the lever portion 170 may include the lever shaft portion 171 constituting the rotation axis 170*a* of the lever portion 170. Here, the lever shaft portion 171 may be disposed adjacent to one end portion of the lever portion 170 than the other end portion of the lever portion 170.

According to the structure of the lever portion 170 and the lever shaft portion 171 as described above, the lever portion 170 is configured to rotate with the other end portion of the drive gear portion 140 as one end portion thereof is pushed and rotated during the rotation of the drive gear portion 140. In addition, the lever shaft portion 171 constituting the rotation axis 170*a* of the lever portion 170 is disposed adjacent to one end portion of the lever portion 170 than the other end portion of the lever portion 170, and a displacement generated at one end portion of the lever portion 170 is shown in an amplified form at the other end portion of the lever portion 170. That is, the displacement generated at the other end portion of the drive gear portion 140 may be transmitted to the sensing portion 150 through the lever portion 170 in an amplified state.

On the other hand, referring to FIG. 10, the household appliance 100 may further include a roller portion 145.

The roller portion 145 may be provided on a portion where one end portion of the lever portion 170 and the drive gear portion 140 are in contact with each other to reduce a frictional resistance generated at a portion where one end portion of the lever portion 170 and the drive gear portion 140 are in contact with each other. For example, the roller portion 145 may be rotatably coupled to the other end portion of the drive gear portion 140. In addition, a groove (not shown) that guides the movement of the roller portion 145 may be disposed at one end portion of the lever portion 170 corresponding to the roller portion 145 along a movement path of the roller portion 145. The roller portion 145 may be configured to have a cylindrical shape. According to the configuration of the roller portion 145, a frictional resistance generated at a portion where one end portion of the lever portion 170 and the drive gear portion 140 are in contact with each other may be reduced, thereby improving the efficiency of the electric motor 130.

In FIG. 10, it is illustrated a shape in which the roller portion 145 is rotatably coupled to the drive gear portion 140. However, the roller portion 145 may be rotatably coupled to one end portion of the lever portion 170.

Figure 11:
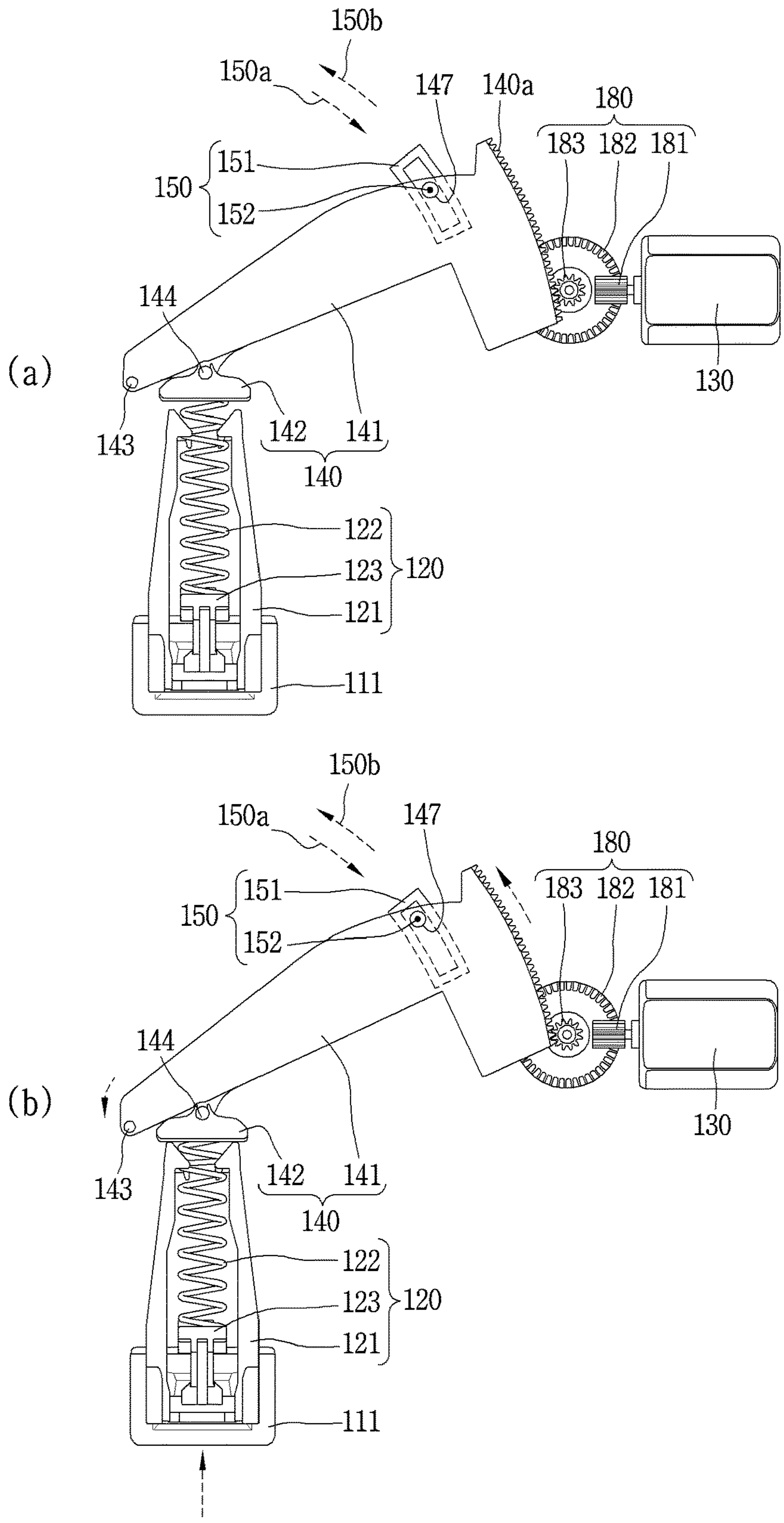

Next, referring to FIG. 11, (a) of FIG. 11 illustrates a shape in which the door 110 is in a locked state. Furthermore, (b) of FIG. 11 shows a state in which a displacement is generated at the other end portion of the drive gear portion 140 due to the pressing of the door 110 while the hook portion 121 moves into the door lock portion 120.

Referring to FIG. 11, the sensing portion 150 may include a sensor housing 151 and a sensor 152.

The sensor housing 151 may be disposed to accommodate the sensor 152 to be described later.

The sensor 152 is configured to be movable along a first direction 150*a* and a second direction 150*b* opposite to the first direction 150*a* on the sensor housing 151, and configured to detect the displacement of the other end portion of the drive gear portion 140 by a movement moving on the sensor housing 151.

Here, the other end portion of the drive gear portion 140 may be configured to move the sensor 152 on the sensor housing 151 when the drive gear portion 140 rotates about the rotation axis 140*b* of the drive gear portion 140.

For example, the sensor 152 may be disposed to protrude from the sensor housing 151. Furthermore, the drive gear portion 140 may include a through hole 147 provided at the other end portion of the drive gear portion 140 and configured to allow the sensor 152 to pass therethrough and be fixed thereto. Here, the sensor 152 may be configured to move together with the other end portion of the drive gear portion 140 during the rotation of the drive gear portion 140 in a state of being fixed to the through hole 147 provided at the other end portion of the drive gear portion 140. That is, when a displacement is generated at the other end portion of the drive gear portion 140, the sensor 152 may be configured to directly receive a movement according to the displacement generated at the other end portion of the drive gear portion 140 so as to move in a first direction 150*a* and a second direction 150*b* opposite to the first direction 150*a* on the sensor housing 151.

In addition, the first direction 150*a* and the second direction 150*b* in which the sensor 152 moves may be configured to form a rotation path having the same curvature as that of a rotation path of the other end portion of the drive gear portion 140 that is formed during the rotation of the drive gear portion 140.

Figure 12:
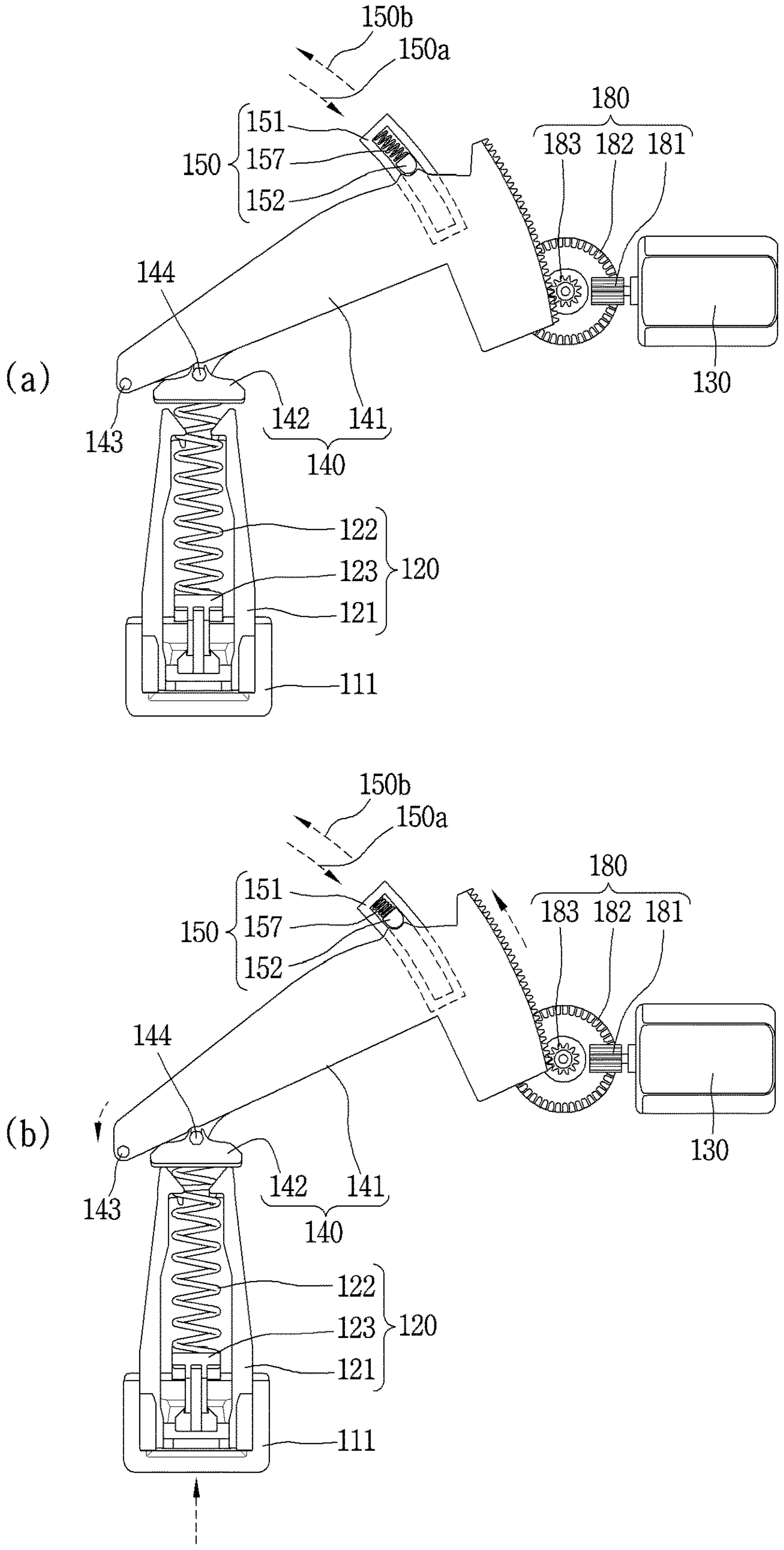

Next, referring to FIG. 12, (a) of FIG. 12 illustrates a shape in which the door 110 is in a locked state. Furthermore, (b) of FIG. 12 shows a state in which a displacement is generated at the other end portion of the drive gear portion 140 due to the pressing of the door 110 while the hook portion 121 moves into the door lock portion 120.

As illustrated in FIG. 12, the sensor 152 is configured to be movable along a first direction 150*a* and a second direction 150*b* opposite to the first direction 150*a* on the sensor housing 151, and configured to detect the displacement of the other end portion of the drive gear portion 140 by a movement moving on the sensor housing 151.

Here, the other end portion of the drive gear portion 140 may be configured to move the sensor 152 on the sensor housing 151 when the drive gear portion 140 rotates about the rotation axis 140*b* of the drive gear portion 140.

For example, the sensing portion 150 may further include an elastic portion 157.

The elastic portion 157 may be configured to apply an elastic force that moves the sensor 152 in the first direction 150*a* to the sensor 152. For example, the elastic portion 157 may be disposed to form the elastic force in an extending direction.

Here, the sensor 152 may be disposed to protrude from the sensor housing 151, and configured to maintain a state of being in contact with the other end portion of the drive gear portion 140 by being pushed in the first direction 150*a* by the elastic portion 157. That is, when the drive gear portion 140 rotates in one direction or the other direction by the elastic portion 157, the sensor 152 may always maintain a state of being in contact with the other end portion of the drive gear portion 140.

In addition, the first direction 150*a* and the second direction 150*b* in which the sensor 152 moves may be configured to form a rotation path having the same curvature as that of a rotation path of the other end portion of the drive gear portion 140 that is formed during the rotation of the drive gear portion 140.

Hereinafter, an operation in which the hook portion 121 illustrated in FIG. 5 moves out of the door lock portion 120 by the drive gear portion 140 to release a locked state of the door 110 will be described with reference to FIGS. 13 and 14.

Figure 13:
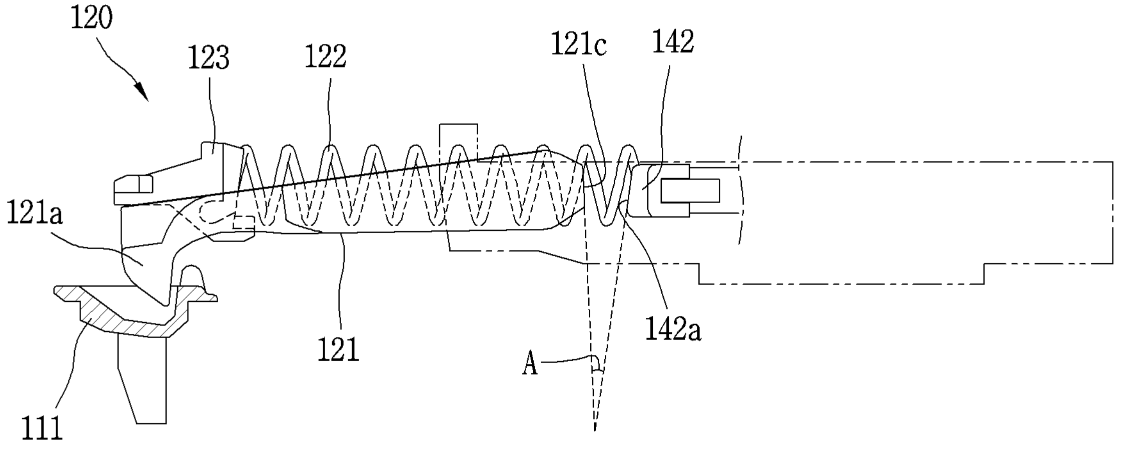
FIG. 13 is a view conceptually showing a shape prior to moving the hook portion illustrated in FIG. 5 out of the door lock portion.
Figure 14:
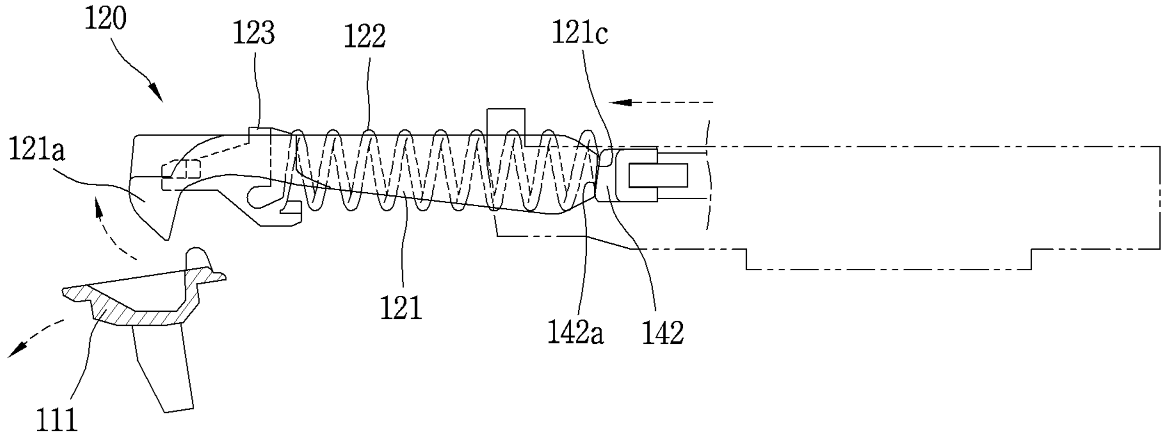
FIG. 14 is a view conceptually showing a shape in which the hook portion illustrated in FIG. 13 is pushed and moved out of the door lock portion by the drive gear portion.

FIG. 13 is a view conceptually showing a shape prior to moving the hook portion 121 illustrated in FIG. 5 out of the door lock portion 120, and FIG. 14 is a view conceptually showing a shape in which the hook portion 121 illustrated in FIG. 13 is pushed and moved out of the door lock portion by the drive gear portion 140.

Referring to FIGS. 13 and 14, the hook portion 121 of the door lock portion 120 and the second section 142 of the drive gear portion 140 may be provided with a first contact surface 121*c* and a second contact surface 142*a*, respectively, which are disposed in contact with each other when the second section 142 moves out of the door lock portion 120 during the operation of the electric motor 130.

Furthermore, as illustrated in FIG. 13, in a state prior to being pushed out of the door lock portion 120 by the second section 142, the hook portion 121 of the door lock portion 120 may be configured such that one end portion provided with the hook engaging portion 121*a* faces lower than the other end portion.

Here, in a state before the second section 142 of the drive gear portion 140 moves out of the door lock portion 120 as illustrated in FIG. 13, the first contact surface 121*c* and the second contact surface 142*a* may be disposed to have an included angle (A) having a predetermined value. Accordingly, when the second section 142 of the drive gear portion 140 moves out of the door lock portion 120 during the operation of the electric motor 130, one end portion of the hook portion 121 may be configured to rotate upward about the other end portion of the hook portion 121.

On the other hand, as electricity is applied to the electric motor 130 to move the second section 142 out of the door lock portion 120, the spring 122 of the door lock portion 120 is compressed, and when electricity supply to the electric motor 130 is stopped, the spring 122 moves the hook portion 121 into the door lock portion 120 while the other end portion is supported by the support portion 123. At the same time, while one end portion of the hook portion 121 rotates downward again about the other end portion, the hook engaging portion 121*a* and the door engaging portion 111 may be fastened to each other again, and the door 110 may be switched to a closed state.

In addition, as illustrated in FIG. 14, when the hook portion 121 moves out of the door lock portion 120 such that one end portion of the hook portion 121 rotates upward about the other end portion, the door engaging portion 111 engaged with the hook engaging portion 121*a* provided at one end portion of the hook portion 121 is released. When the engagement of the door engaging portion 111 is released, the door 110 may be switched from a closed state to an open state while rotating toward a front of the main body 101 by its own weight about the hinge portion 103. On the other hand, when the user wants to directly open the door 110 of the household appliance 100, in a closed state of the door 110, a force greater than an elastic force of the elastic portion 157 may be applied to the door 110 to open the door 110 by a manipulation of pulling the door 110 in a forward direction of the main body 101.

The foregoing is merely illustrative and various modifications can be made by those skilled in the art without departing from the scope and spirit of the described embodiments. The foregoing embodiments may be implemented individually or in any combination.

INDUSTRIAL APPLICABILITY

The present disclosure may be used in industrial fields related to a household appliance having a door.

The invention claimed is:

1. A household appliance comprising:
- a door;
- a door lock portion including a hook portion configured to lock and unlock the door;
- an electric motor configured to generate a rotational force;
- a drive gear portion including a rotation axis at one end portion thereof, the drive gear portion being configured to (i) rotate, based on receiving the rotational force from the electric motor, and (ii) allow a first end portion of the drive gear portion to push the hook portion out of the door lock portion and open the door, based on a second end portion of the drive gear portion rotating in a first direction;
- a sensing portion configured to detect a displacement of the second end portion of the drive gear portion, based on the drive gear portion rotating in a second direction opposite the first direction and the hook portion moving into the door lock portion, and based on a position of the second end portion of the drive gear portion being changed after the displacement compared to the position of the second end portion of the drive gear portion before the displacement; and
- a controller configured to control an operation of the electric motor, based on the sensing portion detecting the displacement of the second end portion of the drive gear portion.

2. The household appliance of claim 1, further comprising:
- a lever portion having a first end portion thereof coupled to the drive gear portion, and a second end portion thereof configured to rotate, based on the first end portion thereof being pushed and rotated by the drive gear portion,
- wherein the sensing portion is configured to detect a displacement of the second end portion of the lever portion and a displacement of the drive gear portion.

3. The household appliance of claim 2, wherein the sensing portion comprises:
- a sensor housing; and
- a sensor configured to (i) move in a first direction and a second direction opposite to the first direction along the sensor housing, and (ii) detect the displacement of the second end portion of the lever portion, based on the sensor moving along the sensor housing, and
- wherein the second end portion of the lever portion is configured, based on the drive gear portion being rotated, to move the sensor along the sensor housing.

4. The household appliance of claim 3, wherein the sensing portion further comprises an elastic portion configured to apply a force that moves the sensor in the first direction,
- wherein the sensor protrudes from the sensor housing, and
- wherein the second end portion of the lever portion is configured, based on the first end portion thereof being in contact with the drive gear portion, to be in contact with the sensor and to block the movement of the sensor in the first direction.

5. The household appliance of claim 4, wherein a first end portion of the elastic portion is fixed, and a second end portion thereof is coupled to the sensor and configured to have a force that moves the sensor in the first direction.

6. The household appliance of claim 5, wherein an engaging hole is defined at the sensor and configured to allow the second end portion of the elastic portion to be fixed thereto.

7. The household appliance of claim 3, wherein the sensing portion further comprises an elastic portion configured to apply a force that moves the sensor in the first direction, and
- wherein the sensor protrudes from the sensor housing, and the second end portion of the lever portion and the sensor are formed with a single body.

8. The household appliance of claim 3, wherein the first direction and the second direction in which the sensor moves are defined to lie on a single straight line.

9. The household appliance of claim 3, wherein the lever portion comprises a lever shaft portion including a rotation axis of the lever portion, and
- wherein the lever shaft portion is disposed closer to the first end portion of the lever portion than the second end portion of the lever portion.

10. The household appliance of claim 2, further comprising:
- a roller portion provided at a position where the first end portion of the lever portion is coupled to the drive gear portion and configured to reduce a frictional resistance generated between the first end portion of the lever portion and the drive gear portion.

11. The household appliance of claim 1, wherein the sensing portion comprises:
- a sensor housing; and
- a sensor configured to (i) move in a first direction and a second direction opposite to the first direction along the sensor housing, and (ii) detect a displacement of the second end portion of the drive gear portion, based on the sensor moving along the sensor housing, and
- wherein the second end portion of the drive gear portion is configured, based on the drive gear portion being rotated, to move the sensor along the sensor housing.

12. The household appliance of claim 11, wherein the sensor protrudes from the sensor housing, wherein a through hole is defined at the second end portion of the drive gear portion and configured to allow the sensor to pass therethrough and be fixed thereto, and wherein the sensor is configured to move with the second end portion of the drive gear portion, based on the drive gear portion being rotated and being fixed to the through hole.

13. The household appliance of claim 11, wherein the sensing portion further comprises an elastic portion configured to apply a force that moves the sensor in the first direction, and wherein the sensor protrudes from the sensor housing and is configured to be coupled with the second end portion of the drive gear portion, based on the sensor being pushed in the first direction by the elastic portion.

14. The household appliance of claim 11, wherein the first direction and the second direction in which the sensor moves form a movement path having the same curvature as a rotation path of the second end portion of the drive gear portion that is formed during the rotation of the drive gear portion.

15. The household appliance of claim 1, wherein the sensing portion is configured, based on a position of the second end portion of the drive gear portion changing after the displacement, to detect a displacement of the second end portion of the drive gear portion.

16. The household appliance of claim 1, wherein the controller is configured, based on the sensing portion detecting a displacement of the second end portion of the drive gear portion, to operate the electric motor.

* * * * *